March 16, 1971 P. M. ERLANDSON ET AL 3,570,055
HIGH SPEED SINTER MOLDING MACHINE
Filed Jan. 10, 1969 2 Sheets-Sheet 1

INVENTORS
PAUL M. ERLANDSON
RICHARD R. SZATKOWSKI
BY
ATT'Y.

March 16, 1971　　P. M. ERLANDSON ET AL　　3,570,055

HIGH SPEED SINTER MOLDING MACHINE

Filed Jan. 10, 1969　　　　　　　　　　　　2 Sheets-Sheet 2

INVENTORS
PAUL M. ERLANDSON
RICHARD R. SZATKOWSKI

BY
ATT'Y.

United States Patent Office 3,570,055
Patented Mar. 16, 1971

3,570,055
HIGH SPEED SINTER MOLDING MACHINE
Paul M. Erlandson, Palos Park, and Richard R. Szatkowski, Western Springs, Ill., assignors to Continental Can Company, Inc., New York, N.Y.
Filed Jan. 10, 1969, Ser. No. 790,283
Int. Cl. B29c 1/14, 3/06, 5/02
U.S. Cl. 18—4
10 Claims

ABSTRACT OF THE DISCLOSURE

A high speed sinter molding machine having endless chains mounted side by side. Mold halves are attached at spaced intervals down the chains. The paired mold halves come next to each other to form a female mold into which is deposited a polymeric material. A mandrel extends inside the mold and as the mold traverses its path, it surrounds the mandrel and the mandrel deposits polymeric powder, heats the polymeric powder, and then cools it. At the end of the mold path, the finished article is ejected and is ready for the next operation.

---

Our invention relates to a sinter molding apparatus, and particularly to an apparatus for the very high speed manufacture of polymeric articles from polymeric powders using sintering techniques.

Various equipment has been developed using sintering techniques wherein a polymeric powder is sprayed or dusted onto a heated mandrel and fused into a homogenous surface.

It is an object of our invention to provide a machine for the high speed manufacture of sintered articles.

It is another object of our invention to provide a machine for sintering thermoplastic resins and having flexible usage in the manufacture of container elements.

It is another object of our invention to provide a machine for the manufacture of containers with unusual molded shapes.

It is a final object of our invention to provide for the manufacture of composite structures of thermoplastic resin.

In brief, our invetion relates to a high speed means for making sintered hollow articles. Two endless belts are mounted side by side and have paired mold halves located at spaced intervals along the belts. As the belts traverse their path, one mold half from each belt contacts an opposed mold half to form a complete female mold for about half of the cycle time. A mandrel is located longitudinally inside the female mold and deposit nozzles, heaters, and coolers are located at spaced positions down the mandrel to accomplish the ultimate purpose of depositing a thermoplastic resin container element in the female mold. The finished article is ejected from the end of the system and may be further cooled as part of the next operation.

Figure 1:
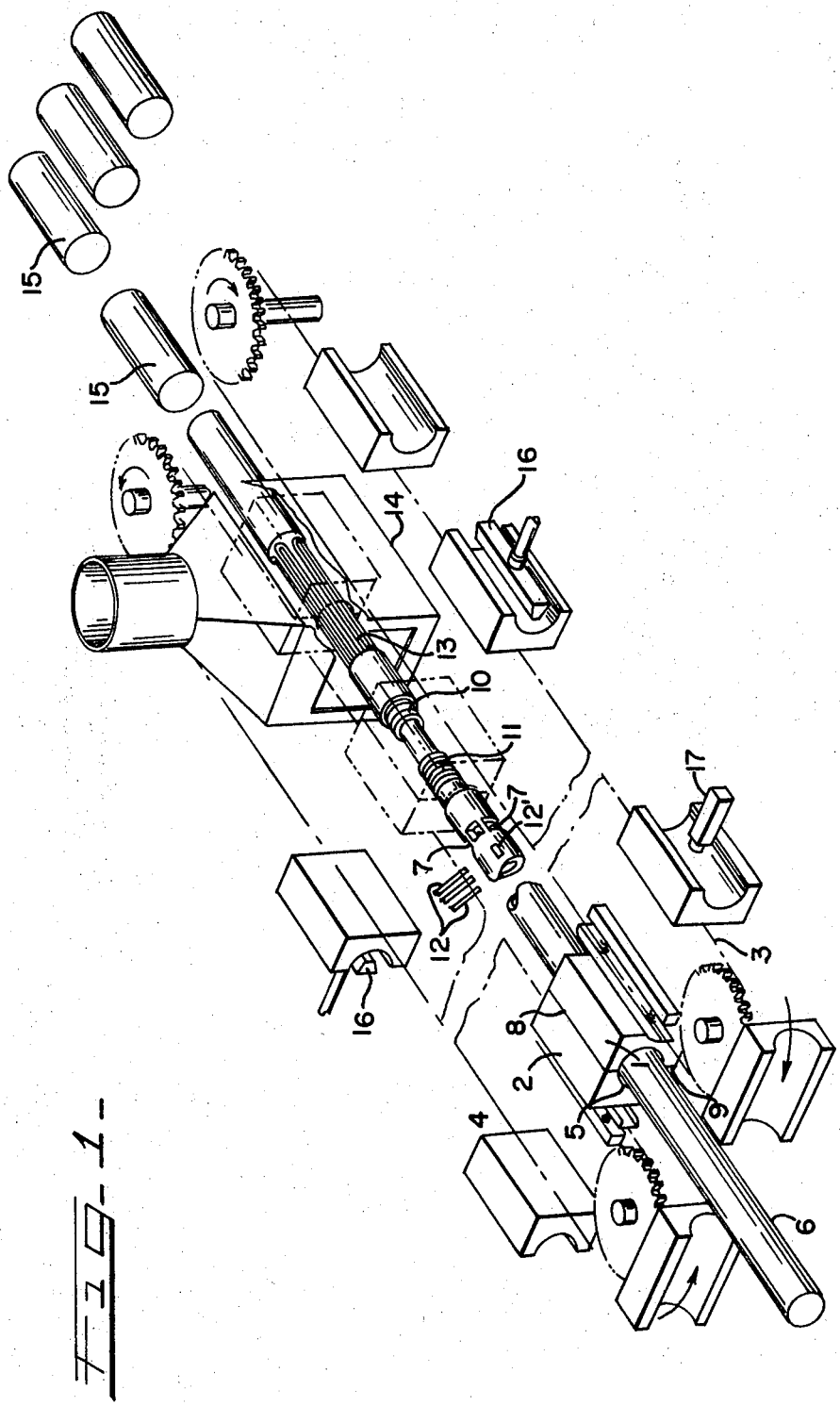
Figure 2:
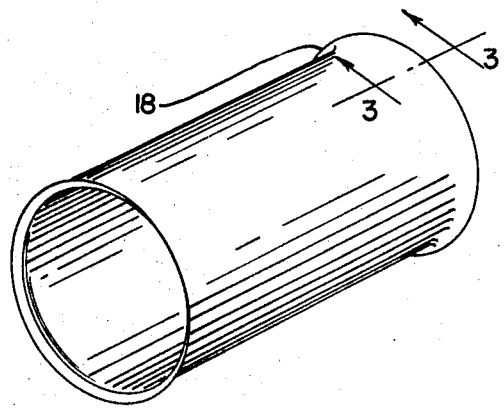
Figure 3:
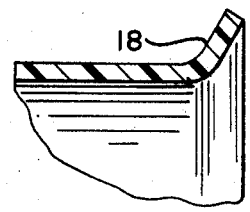
Figure 4:
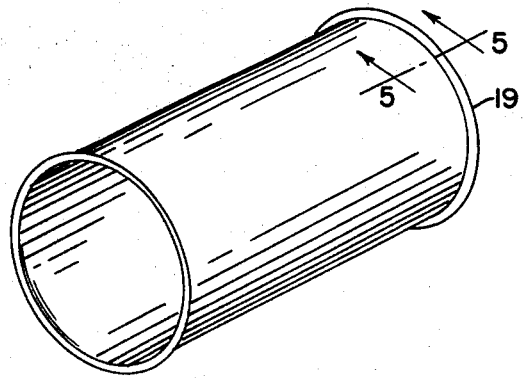
Figure 5:
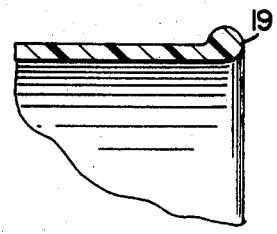
Figure 6:
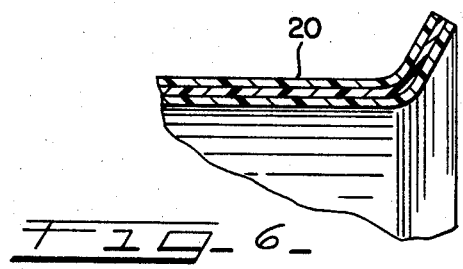

With the above and other ojects in view that will hereinafter appear, the nature of the invention is more clearly understood by reference to the following detailed description, the appended claims, and the several views illustrated in the accompanying drawings in which:

FIG. 1 shows a schematic view of the apparatus;
FIG. 2 shows a product of the apparatus having a flanged end;
FIG. 3 shows a cross-section view of the flanged end taken along line 3—3;
FIG. 4 shows a product of the apparatus having a bead end;
FIG. 5 shows a cross-section view of the bead end taken along line 5—5; and
FIG. 6 shows a laminated product of the apparatus.

The organization and structure of the endless belt or chain device is essentially the same as that shown in the patent entitled "Tube Pulling Mechanism for a Continuous Welding Machine," by Edwin D. Baugh et al., No. 3,056,535, issued Oct. 2, 1962, and assigned to the assignee of this invention.

In our device, the jaw assemblies of the above apparatus are replaced by mold halves.

The mold halves 1, 2 are attached to the endless belts or chains 3, 4 (FIG. 1) and as the halves pass down the center of the machine, they are pressed together to form a single mold surface 5. The mold surfaces or parts are not necessarily matched as to shape or size and irregular composite, decorated, hollow or printed containers or articles may be manufactured by our device.

A mandrel 6 is mounted with its long axis parallel to the direction of travel of the mold and located so that the mold passes over the mandrel. The embodiment shown in FIG. 1 has polymeric powder deposit nozzles 7 lined around the exterior periphery of the mandrel 6. A finely divided polymeric powder which is suspended in air is forced out of the nozzle. As the mold form 5 passes over the nozzle, powder is sprayed out against the sides of the mold and adheres to the sides of the mold.

The polymeric powder deposit nozzles may be lined around the periphery of the mandrel surface to coat the entire inner surface of the female mold or the nozzles may be directed to coat any desired areas, such as the seams 8, 9 shown as above and below. Deposition is accomplished by charging the particles electrostatically and having the mold at a different potential so that the charged particles are attracted to the mold.

The powder deposited on the inner wall 5 may be fused by a mandrel heating device 10 located next down the line. Mandrel heating may be accomplished by an electro-induction heating coil 11, for example, for putting a well-controlled finishing heat to the thermoplastic resin. Alternatively, heat may be applied inside the mold halves by heating coils, for example. The heat applied at this point is sufficient to cause the thermoplastic material to fuse and may be controlled by a thermal sensing device 12, such as one or more small infra-red sensitive photo conductors, located on the mandrel to sense the temperature of the powder on the form. Alternatively, the mold temperature may be picked up by the same kind of sensor 12 located exteriorly of the mold. Depending on the powder temperature, additional heat may be applied to the powder by a fine heat control system, such as induction heater 11.

A fine heating at coils 10, 11 could be accomplished by inductive heating controlled by an automatic temperature sensing device such as an optical pyrometer 12'. In practice, a series of optical pyrometers are located down the length of the mandrel and may be located just up-stream of the mandrel heating device. These pyrometers control the degree of heat used so that the polymeric powder deposited inside of the mold is heated only to the temperature necessary for fusion in order to avoid detrimental effects which might take place at very high temperatures.

Heaters 10, 11 raise the temperature of the polymeric powder just sufficiently to cause fusion. Thus, the amount of cooling necessary in the next step is reduced. In any case, after the fused thermoplastic article has passed the mandrel inductive heating device 11, it is at such temperature that a given amount of cooling reduces it through the number of degrees necessary to give it the properties desired.

After the powder has fused to form, the fused material is exposed to a cooling element 13 so that the hot fused resin becomes solid. A water or air cooling chamber 14 may be located along the path and cool the mold as the mold moves through the chamber.

The cylindrical container element 15 is now ejected from the machine and is ready for the next operation. The next operation may be further cooling or possibly the application of an end to the hollow article.

The mold halves 1, 2 have little heat capacity and cool quite rapidly to the ambient temperature. As the mold halves come off the mandrel line, they are still relatively warm. The temperatures of the mold halves may be regulated so that there will not be instant fusion at the time the polymeric powder is deposited upon the mold half, and the polymeric thermoplastic resin must be adapted to cool below the fusion point to set when it arrives at the cooling elements 13, 14 so that when the formed articles are ejected from the sintering device, the articles retain their shape. In order to accomplish this result, control of the temperature of the mold halves is essential.

The rate of cooling affects plastic properties, and quick cooling is usually more desirable than slow cooling because quick cooling results in a less crystalline, tougher plastic article than does slow cooling. In any case, the rate of cooling may be controlled by cooling elements 13, 14 to give the properties desired in the plastic or plastics being used. After the mold half has released the plastic article, the mold halves separate, passing to the outside of their conveyor system. As shown in FIG. 1, any number of stations are possible along the inside run or the outside run of the belt, depending upon how many different types of powder one may wish to deposit. Also, if one wishes to manufacture many articles at a rapid rate of speed, the machine has a greater number of stations along the side, i.e., the longer the manufacturing line and the greater number of nozzles found on the line, the faster the articles may be manufactured. That is to say, each nozzle may deposit only a limited amount of powder at each application, but by having a number of nozzles, thicker coats may be built up or the molds may be moved by the nozzles more rapidly.

The outside run of the endless belt may have a preheat station 16 where the mold is heated by bulk energy such as electric coil heat or a gas flame. The next operation may be depositing powder along the inside of the mold half by a nozzle 17. If powder is deposited on the inside of the mold half at this point, then the mandrel nozzle 7 may be used to deposit a thermoplastic resin only along the seams 8, 9 so as to hold together the preformed halves of the final articles. In the event that heat has been applied to the mold before the mold half arrives at the mandrel, the mandrel heating step may be induction heat. The article is then cooled and ejected as indicated above.

The shape of the mold is not restricted and this process deposits a fairly even layer of material on any mold, for example, in FIGS. 2 and 3, a flanged end 18 is shown.

The rate of deposition of this material may be varied by heating selected spots along the mold. Any spot which is heated causes the electrostatic charge of the powder to disperse from the heated spot. Because the electrostatic charge is carried by the powder to the mold, electrostatic charge could build up normally to repel further material from depositing. However, if a spot is heated, the electrostatic charge is dispersed more rapidly and further deposition at the heated spot is possible as shown in FIGS. 4 and 5 to give rise to a thickness 19 two or three times the normal or usual amount of material thickness deposited.

In this way, a variety of thicknesses can be built up at different points depending upon decorative effects or simple strengthening of the article which may be desired.

FIG. 1 shows a single exterior station which has a preheat device 16 and a predeposition of powder station 17. If a composite laminated wall as shown in FIG. 6 is desired, then a series of stations may be mounted on the outer and inner runs of the female mold conveyor. A broken line is shown to indicate that the conveyor may be considerably longer than shown. If one desires to apply a series of powders in layers, by applying a first powder to the mold, allowing it to set, and then applying a series of other powders to the mold, a composite laminate structure may be built up. The various powders used may be selected for a desired characteristic each, such as saran for imperviousness to carbon dioxide, pigmented polyethylene powders for printing or desired color effects, etc.

In the event a multi-layered laminate has been built up in each of the mold parts, the fluidized powder from nozzle 7 is directed along the seam, and this powder must be such as to form a tight bond with the materials used for lamination or at least with the last or inner laminating material.

It is noted that the form of the article may not be cylindrical and may be any other shape, such as in the shape of a cone in which the powder is deposited along the radial surfaces. This cone may be made of laminated composite material or of a single material. In any case, the stacking of such cones is relatively snug and easy.

Similarly, if the mandrel was shortened to eliminate the mold cooling stage, an article end of any desired sort, such as an easy-open end, can be installed against the rim of the formed polymeric sintered article. Polymeric powder may be deposited at a succeeding heating and cooling stage and the end may be fixed to the rest of the body to form the end of a container.

If it is desired to incorporate the decorative effects of different colors of powder or apply solid inserts, these results may be obtained by using the mandrel nozzles to supply different colors as desired to the areas to be colored. Similarly, powder may be applied to the seamed area between the solid insert and a body. When the powder is sufficiently heated and cooled, a single body is formed. A mask is used for blocking.

It is readily apparent that this apparatus is a high speed, highly controllable process of sintering thermoplastic material into various shapes.

Advantages of this mode of operation are that there is zero scrap, the method of depositing the material is flexible, the shape of the mold may be varied, i.e., the material may be deposited into a variety of shapes, such as cylindrical, conical etc., decoration may be built into the mold by means of shielding, composite structures are possible, inserts may be applied to an article, there is low pressure on individual molds, and the mold thinness makes for an inexpensive mold easily replaceable according to the desired shape of the article.

A final advantage is that the machine can be made of any length to adjust to greater or lesser speed desired.

Further, a variety of powders of exotic nature may be fitted through the polymeric powder nozzles. The only apparent requirement is that the powder will go into an aerosol solution or be amenable to being carried by a gas. For example, any thermoset powder characteristics are lost after heating. Thus, in extrusion molding, all powder not used in the article has its characteristics changed so that it is no longer usable. In our device, only the powder used in the article is heated. The rest of the powder can be collected and reused.

The foregoing is a description of an illustrative embodiment of the invention, and it is applicants' intention in the appended claims to cover all forms which fall within the scope of the invention.

What is claimed is:

1. Apparatus for sinter molding hollow articles comprising:

paired conveyors comprising;

mold halves mounted on endless belts; and endless belts mounted in opposed relation and synchronized whereby during a run of the belt, opposed mold halves press together to form a female mold between the belts;

a mandrel extending between the endless belts so that the female mold passes around and along the extent of the mandrel, and over the end of the mandrel;

a polymeric powder deposit nozzle mounted on said mandrel for depositing powder on said female mold;

a heating element mounted on said mandrel next to said nozzle for heating said deposited polymeric powder to fusion;

a cooling means comprising means mounted on said mandrel toward its end for cooling said fused powder to solidification to form an article; and means for moving said belts and mold halves whereby said article is propelled toward the end of said mandrel and off of said mandrel and from between said halves toward the next operation.

2. Apparatus for sinter molding as set forth in claim 1 in which said cooling means further comprises:

a cooling chamber surrounding the path of traverse of said female mold at the mandrel cooling means and substantially enclosing said mandrel cooling means.

3. Apparatus for sinter molding as set forth in claim 2 having preheat means mounted on the other reach of each belt for heating the inside of said mold half.

4. Apparatus for sinter molding as set forth in claim 3 having:

powder predeposition means located adjacent said preheat means whereby said predeposition means deposits a powder into said heated female mold.

5. Apparatus for sinter molding as set forth in claim 4 in which:

ports are located in said polymeric powder deposit nozzle for deposition of polymeric powder on the seam areas of said article before final fusion.

6. Apparatus for sinter molding as set forth in claim 1 in which:

heat sensing means is mounted along the path of the female mold for detecting the temperature of said mold halves just before they reach the heating element and for regulating the temperature of said heating element in accordance with the heat necessary to fuse said polymeric powder.

7. An apparatus for sinter molding as set forth in claim 1 in which said heating element comprises:

induction heating means for delivering an accurately determinable amount of heat to said deposited polymeric powder.

8. An apparatus for sinter molding as set forth in claim 1 in which:

a mask is positioned between said polymeric powder depositing nozzle and said female mold whereby pigmented powder may be applied through said mask to decorate parts of said article.

9. An apparatus for sinter molding as set forth in claim 4 in which:

a mask is positioned between said polymeric powder predepositing means and said female mold whereby said powder deposited on said mold may be in the shape of a pattern; and a second mask is positioned between said polymeric powder deposit nozzle and said female mold whereby said polymeric powder is deposited onto said female mold to form a second pattern.

10. An apparatus for sinter molding as set forth in claim 1 in which:

a source of electrostatic charge is located in said powder deposit nozzle for charging particles of powder; and said mold halves are charged to a different potential from said particles whereby said charged particles deposit on the mold halves.

References Cited

UNITED STATES PATENTS

| | | | |
|---|---|---|---|
| 2,750,625 | 6/1956 | Colombo | 18—5 |
| 3,035,302 | 5/1962 | Lysobey | 18—5 |
| 3,187,381 | 6/1965 | Britten | 264—24X |
| 3,262,150 | 7/1966 | Morin | 18—4 |
| 3,298,064 | 1/1967 | Taga | 18—4X |
| 3,491,170 | 1/1970 | Roe, Jr. | 18—5 |

J. SPENCER OVERHOLSER, Primary Examiner

R. L. SPICER, JR., Assistant Examiner